Oct. 23, 1928.
M. K. AKERS
1,689,006
VARIABLE INDUCTANCE DEVICE
Original Filed Dec. 31, 1919
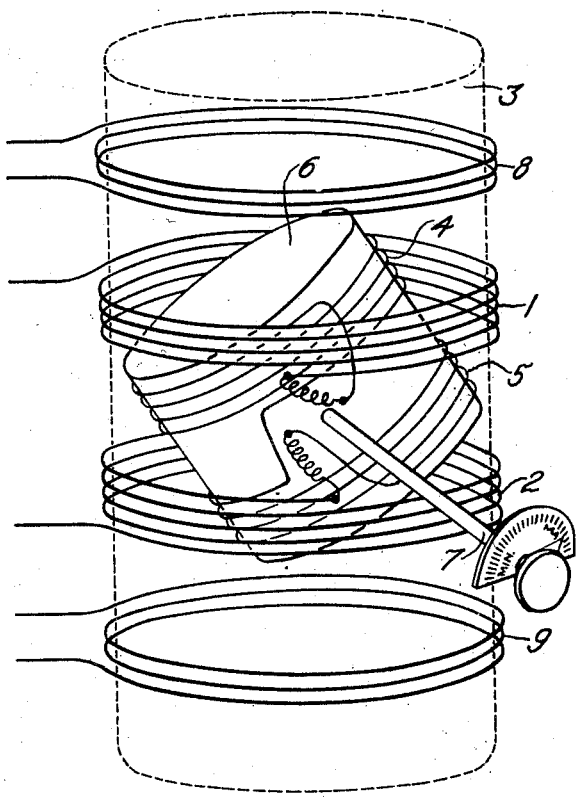
Inventor:
Milton K. Akers
by ───── Atty.

Patented Oct. 23, 1928.

1,689,006

UNITED STATES PATENT OFFICE.

MILTON K. AKERS, OF TROY, OHIO, ASSIGNOR TO WESTERN ELECTRIC COMPANY, INCORPORATED, OF NEW YORK, N. Y., A CORPORATION OF NEW YORK.

VARIABLE-INDUCTANCE DEVICE.

Original application filed December 31, 1919, Serial No. 348,555. Divided and this application filed December 12, 1925. Serial No. 75,024.

This invention relates to variable inductance devices and more particularly to a form of variometer adapted to control the degree of coupling between two circuits and the self-inductance of one of the circuits.

This application is a division of a copending application of Milton K. Akers, Serial No. 348,555, filed December 31, 1919.

It is an object of this invention to provide a coupling means for circuits of the above mentioned character which is adapted to vary the self-inductance of one of the circuits and at the same time to produce compensating changes in the coupling between the circuits.

The above object and others which will be apparent as the nature of the invention is disclosed are accomplished by employing a variometer having stator and rotor windings, and a second winding mounted in fixed inductive relation to the stator winding. This second winding is adapted to serve as a portion of the coupling means between the two circuits. The variation in coupling between the second winding and the rotor winding of the variometer is made use of to produce such a change in the coupling between the two circuits as to compensate for the effect of the change in the inductance of one of the circuits.

Although the novel features which are believed to be characteristic of this invention will be pointed out with particularity in the claims appended hereto, the invention itself may be more readily understood by referring to the following description taken in connection with the accompanying drawing forming a part thereof in which the figure is a perspective view of a variable inductance device constructed in accordance with this invention.

Referring more particularly to the figure, coils 1 and 2 are wound in parallel planes upon a cylindrical core member 3 which is merely indicated by dotted lines in the drawing in order that the various parts of the apparatus may not be concealed thereby. Coils 4 and 5 are likewise in parallel planes and are mounted upon a rotatable cylinder 6 positioned in the interior of coils 1 and 2. Cylinder 6 is adapted to rotate through 180° on the shaft 7 which is supported by suitable bearings in cylinder 3 (not shown). When the planes of these four coils are parallel, as occurs in one position, coil 4 is adjacent coil 1 and coil 5 is adjacent coil 2, thereby producing the maximum inductance for the composite coil 1, 2, 4, 5. When coils 4 and 5 are rotated, however, their respective mutual inductances with coils 1 and 2 vary substantially in accordance with the sine of the angle of displacement, thus varying the inductance of the composite coil.

Coils 1 and 2 constitute a divided stator winding and coils 4 and 5 constitute a divided rotor winding symmetrically positioned with respect to shaft 7 and connected in series as shown in the drawing.

Coils 8 and 9 are wound adjacent and in the same plane with coils 1 and 2 respectively and are in fixed relation thereto. The mutual inductance between coils 8 and 1 is fixed while that between coils 8 and 4 varies in accordance with their respective angular positions. A similar condition exists with respect to coils 2, 5 and 9. Coils 8 and 9 are adapted to be connected in series to form a portion of the circuit which is coupled by means of those coils to the circuit including coils 1, 2, 4 and 5 and are symmetrically positioned with respect to coils 1 and 2 and also with respect to shaft 7. Taken together they constitute a divided winding.

When the rotor 4 is moved in such a direction as to reduce the self-inductance of the coil 1, 2, 4, 5, for example, to increase the natural frequency of the circuit in which the coil is included, the coupling between that coil and the windings 8 and 9 also will be decreased.

Although this invention has been shown and described as applied to a particular apparatus constructed in a specific manner it is not to be limited thereto but only in accordance with the scope of the invention as defined by the appended claims.

What is claimed is:

1. In a variable inductance, a tubular core, a stator winding on said core, a second winding of a separate circuit on the core alongside the stator winding and in fixed relation thereto, a rotor winding adjustable in the tubular core about an axis disposed at an angle to the axis of the tubular core and carrying a winding positioned by the rotor to cooperate with both the stator winding and the second winding.

2. In a variable inductance, a tubular core, a divided stator winding on said core, a second winding of a separate circuit on said core adjacent the stator winding and in fixed inductive relation thereto, an adjustable rotor in said core, disposed at an angle to the axis thereof, said rotor carrying a divided winding positioned to cooperate with both the divided stator winding and the second winding.

3. In a variable inductance, a tubular core, a divided stator winding on said core, a second divided winding on the core adjacent said stator winding and in fixed inductive relation thereto, a rotor in the tubular core and adjustable about an axis disposed at an angle to the axis thereof, said rotor carrying a divided winding positioned to cooperate with both the stator winding and the second winding.

4. In a variable inductance, a tubular core, a divided stator winding on said core, a second divided winding on the core alongside said stator winding in fixed inductive relation thereto, a rotor adjustable in said core about an axis disposed at an angle to the axis thereof, said rotor carrying a divided winding positioned to cooperate with both the stator winding and the second winding, all of said windings being symmetrically positioned with respect to the axis about which the rotor is adjustable.

5. In a variable inductive device, a tubular core, a divided stator winding and a second divided winding in fixed inductive relationship thereto, all of said windings being wound upon said core, a rotor in said core, said rotor being adjustable about an axis disposed at an angle to the axis of the tubular core and carrying a winding adapted to cooperate with each of said first mentioned windings.

6. In a variable inductive device, divided stator and rotor windings, a second divided winding in fixed inductive relation to said stator winding and in variable inductive relation to said rotor windings all of said windings being symmetrically positioned with respect to the axis of rotation of said rotor winding.

In witness whereof, I hereunto subscribe my name this 1st day of December, A. D., 1925.

MILTON K. AKERS.